July 12, 1966   F. MÜLLER   3,259,997
APPARATUS FOR HEAT EXCHANGE BETWEEN GAS AND
FINE-GRANULAR MATERIAL
Filed Oct. 22, 1962   2 Sheets-Sheet 1

INVENTOR
Franz Müller

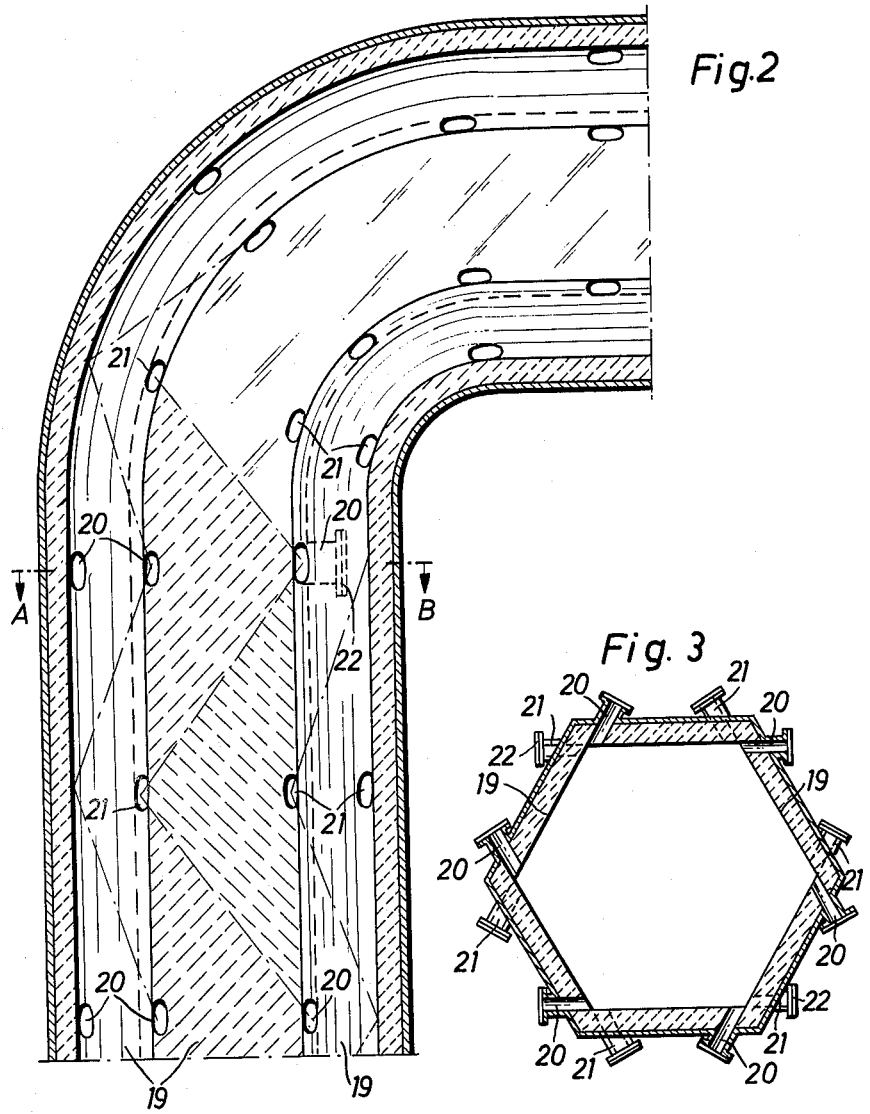

United States Patent Office 3,259,997
Patented July 12, 1966

3,259,997
APPARATUS FOR HEAT EXCHANGE BETWEEN GAS AND FINE-GRANULAR MATERIAL
Franz Müller, Bensberg-Refrath, Germany, assignor to Klöckner-Humboldt-Deutz Aktiengesellschaft, Cologne-Deutz, Germany, a corporation of Germany
Filed Oct. 22, 1962, Ser. No. 232,151
Claims priority, application Germany, Oct. 31, 1961, K 45,086
4 Claims. (Cl. 34—57)

My invention relates to apparatus for heat exchange between gas and fine-granular material, and in a more particular aspect to apparatus comprising a number of serially interconnected dust-from-gas separators, preferably cyclones or similar centrifugal separators, which are connected with each other by gas conduits having normally closed, lateral access openings that permit cleaning the inner surfaces of these conduits from the outside to remove any adherent depositions. In such apparatus, the gas passes sequentially through the dust separators, and the dust passes through the separators in the reverse sequence, being intimately contacted by the gas before being ultimately separated from the gas flow.

Such heat exchanging apparatus, suitable for various purposes, have been employed for the preheating of cement raw material by kiln waste gases prior to charging the heated raw material into the kiln. The fine-granular material, for example cement raw material, is supplied to a hopper and passes through a feed pipe into the path of the gases flowing through a conduit into a separator. The material is thus entrained by the gas into the separator where an intensive heat exchange takes place before the granular material is separated and passes through a dust discharge pipe into a gas conduit at a lower location which entrains the material into a separator that precedes the first-mentioned separator relative to the gas flow direction. In this manner the material passes continuously through several separators until it is sufficiently heated and passes from the lowermost separator through a feeder pipe, separate from the waste gases, to the further fabricating equipment, for example a rotary kiln. During such operation, undesired quantities of dust may become deposited and baked upon the inner surfaces of the gas conduits, depending upon the constitution of the raw material. The deposits must be removed from time to time. To facilitate cleaning of the conduit walls, the gas conduits have been given a cross section of square shape according to my Patent No. 2,797,077, assigned to the assignee of the present invention. While such waste-gas conduits have been found in practice to secure the desired improvement, they also impose a limitation upon the width and cross section of gas conduits in such economically applicable heat-exchanging apparatus.

When attempting to increase the size of the conduit cross sections, difficulties are encountered particularly with respect to the attachment of the refractory lining at the ceilings of the conduit elbows and also with respect to properly cleaning baked depositions away from the conduit walls, due to the necessity of employing very long rod-shaped tools. These difficulties can be coped with technologically by increasing the number of fastening points for the refractory lining, and increasing the number of lateral openings through which the cleaning tools can be inserted, but these expedients are excessively expensive and far from satisfactory.

It is an object of my invention to devise a heat-exchanging apparatus of the above-mentioned type that readily permits giving the interconnecting gas conduit between the separators of the series any desired large cross section without entailing the increased manufacturing difficulties encountered with the heretofore available possibilities while also facilitating the satisfactory cleaning of the inner wall surfaces in the conduits. Another object of my invention, akin to the one mentioned, is to improve and simplify the above-mentioned cleaning operations, regardless of the cross-sectional size of the interconnecting gas conduits of the heat exchangers by permitting the satisfactory use of much shorter scraper rods or the like cleaning tools than heretofore necessary.

To this end, and in accordance with my invention, the gas conduits connected to, and intermediate the separators in a heat-exchange system of the above-mentioned type are given a polygonal cross section whose internal side length is smaller than its inner width so that the length of each straight polygonal perimeter portion is considerably smaller than the diameter or inner width of the conduit; and the cleaning openings extend through each longitudinal wall portion at an acute angle of inclination to the wall surface so that the axis of each opening is substantially parallel to the inner surface of the next adjacent wall portion, it being preferable to have the opening extend flush to the latter surface.

According to another, preferred feature of the invention, the above-mentioned gas conduits are given a regular hexagonal cross section requiring the cleaning openings along the respective longitudinal edges of the conduit to be 60° inclined with respect to the wall surfaces.

By virtue of the invention, the edge length of the conduit cross section can be kept small even if the total cross section of the gas conduits is considerably increased. In this manner the edge length is preferably kept shorter than two meters. This has the advantage that the conduits can be lined with refractory material without difficulty particularly at the back or ceiling portions of the elbows. Furthermore, the cleaning of the inner surfaces is greatly simplified since the cleaning tools are kept much shorter and can be more easily handled from the outside.

The invention will be further described with reference to the embodiment illustrated by way of example on the accompanying drawings, in which:

FIG. 2 is a sectional view of one of the waste gas conduits that form part of the same apparatus; and FIG. 3 is a cross section along the line A–B in FIG. 2.

Figure 1:
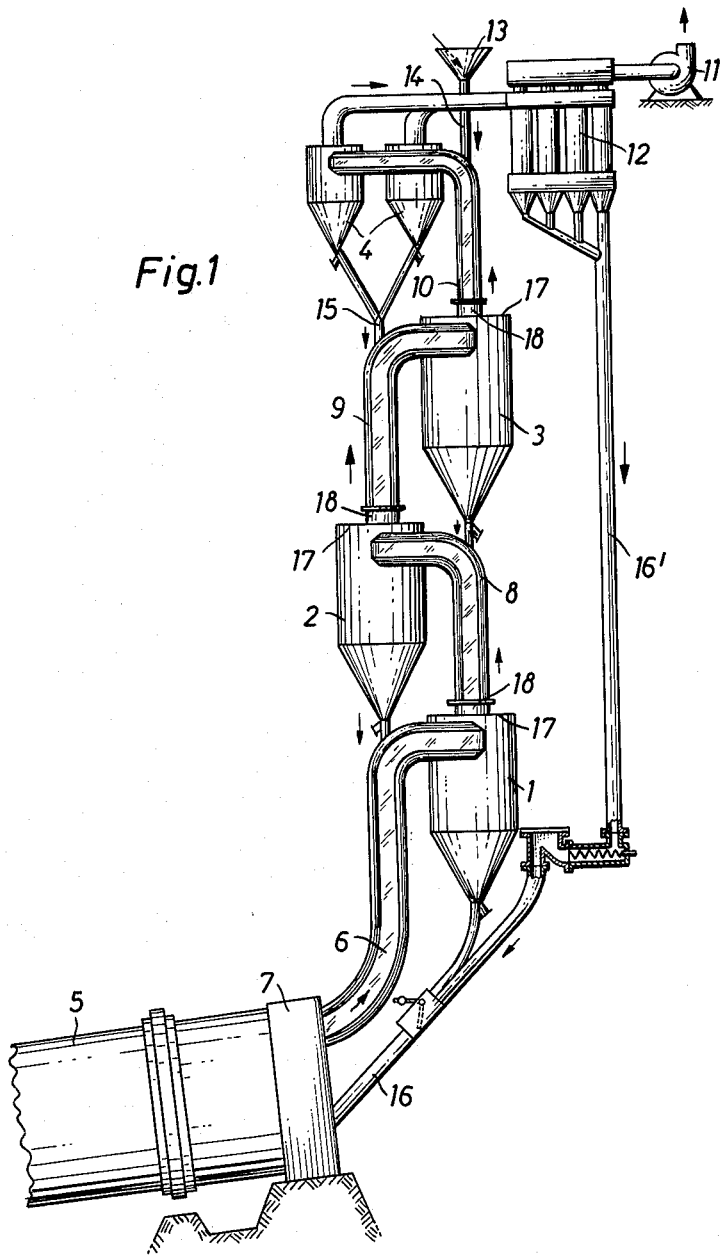
FIG. 1 shows a total view of a plant for preheating cement raw material by waste gases from a rotary kiln.

The heat exchanging apparatus according to FIG. 1 comprises four centrifugal dust separators 1, 2, 3, 4 of the cyclone type serially connected to a rotary kiln 5. The separator 4 is composed of two parallel connected units. The separator 1 is connected by a waste gas conduit 6 with the stationary hood 7 of the rotary kiln. The hot waste gases from the kiln, after passing through the conduit 6 and the separator 1, flow successively through the separators 2, 3 and 4 which are interconnected by waste gas conduits 8, 9 and 10. The gases leaving the separator 4 are exhausted by means of a blower 11 through a dust separator 12 which is composed of several smaller centrifugal units of relatively small diameter and serves to keep residual fly dust out of the ambient atmosphere.

The material to be preheated is charged into a hopper at 13 and passes through a feed pipe 14 into the gas conduit 10 where it is finely distributed by a baffle cone or pendulous flap (not illustrated, but reference may be had to the above-mentioned Patent No. 2,797,077) in order to be entrained by the ascending flow of gas which carries the material into the two units of separator 4. After being intimately mixed by whirling motion in these units, the preheated material is separated and passes through a dust discharge pipe 15 into the gas conduit 9 where it is finely distributed and entrained by the ascending gas flow into the separator 3. From separator 3 the further preheated material passes into the gas conduit 8. The same operation is repeated with respect to separators 2 and 1 until the preheated cement material is discharged through a pipe 16 into the kiln 5. The residual dust separated in the ultimate separator 12 passes directly through a dust pipe 16' to the supply pipe 16 and thus also to the kiln 5.

According ot the invention, the gas conduits 6, 8, 9 and 10 are each given a polygonal cross section with more than four corners, preferably a regular hexagonal cross section. The transfer from the circular outlet opening at the tops 17 of separators 1, 2 and 3 is effected by means of an intermediate cylindrical neck 18 of short axial length whose upper end is so lined by masonry that the cross section widens gradually to the hexagonal cross section of the respective conduits 8, 9, 10.

As is apparent from FIG. 2, a number of lateral openings 20 and 21 are provided to permit the cleaning of the inner surfaces of the conduit from undesired baked deposits at the inner surfaces 19. These openings are preferably arranged near the corners of the inner conduit surfaces, thus forming respective rows that extend along the longitudinal edges of the polygon wall portions of the conduit. To facilitate cleaning the inner surfaces, it is further preferable to give each of the openings 20, 21 an elongated cross section which at one of its long sides is flush, or substantially flush, with the adjacent inner surface portion of the conduit. The spacing between the openings is so chosen that when the inner surface of the conduit is being cleaned by means of rods, the areas that can be cleaned from the respective openings are contiguous or overlap so that the entire inner surface can be reached. For example, each location at the inner surface 19 can be reached from the openings 20 and 21. That is, each triangle having its apex at an opening 21 (as schematically shown by broken-line hatching) is bordered by two triangles whose respective apexes are at openings 20. In this manner, all inner surfaces of the conduits are subdivided into cleaning areas and can be liberated from deposits area by area. The elbow portions of the conduits are likewise provided with openings whose mutual distances, however, are generally kept shorter so that the above-mentioned triangles will overlap each other in the border areas. The particles scraped or pushed off the inner surfaces are either entrained by the gas flow and are then separated in the next higher cyclone, or they drop directly into the lower cyclone or into the rotary kiln.

As shown in FIG. 3, the openings are provided with covers 22 which are normally closed and can readily be removed for cleaning purposes. Such cleaning can also be performed during operation of the apparatus.

I claim:
1. Apparatus for heat exchange between gas and fine-granular material comprising a plurality of dust-from-gas separators and respective gas conduits serially interconnecting said separators to form a continuous gas path therethrough, material conveying means having pipe means extending from each subsequent separator relative to said gas path to the gas conduit entering the preceding separator, said material conveying means forming a path for material generally in counter flow to the gas, said gas conduits having a polygonal cross section whose internal side length is less than 2 meters and internal cross-sectional area is greater than the square of 2 meters, and the polygon wall portions of said conduits having normally closed cleaning openings extending through the wall portion at an acute angle to the wall surface near one of the longitudinal edges of the wall portion with the axis of the respective openings substantially parallel to the inner surface of the next adjacent wall portion, whereby the entire width of said inner surface is accessible through said opening to cleaning by a tool shorter than the inner width of said conduit.

2. Apparatus for heat exchange between gas and fine-granular material comprising a plurality of dust-from-gas separators and respective gas conduits serially interconnecting said separators to form a continuous gas path therethrough, material conveying means having pipe means extending from each subsequent separator relative to said gas path to the gas conduit entering the preceding separator, said material conveying means forming a path for material generally in counter flow to the gas, said gas conduits having a polygonal cross section whose internal side length is less than 2 meters and internal cross-sectional area is greater than the square of 2 meters, and the polygon wall portions of said conduits having normally closed cleaning openings distributed along a longitudinal edge of the conduit and extending through the wall portion at an acute angle to the wall surface in substantially parallel and flush relation to the inner surface of the next adjacent wall portion.

3. Apparatus for heat exchange between gas and fine-granular material comprising a plurality of dust-from-gas separator cyclones and respective gas conduits serially interconnecting said cyclones and forming a gas path together therewith, material conveying pipe means extending from each subsequent cyclone to the gas conduit entering into the preceding cyclone of said gas path and forming together with said cyclones a path for material generally in counter flow to the gas, said gas conduits having a regular hexagonal cross section whose internal side length is less than 2 meters and internal cross-sectional area is greater than the square of 2 meters, and the longitudinal wall portions of said conduits having normally closed cleaning openings distributed along a longitudinal edge of the conduit, and extending through the wall portion at an angle of 60° to the wall surface in substantially parallel and flush relation to the inner surface of the next adjacent wall portion.

4. In heat exchanging apparatus according to claim 1, said openings being elongated and having one of their long sides substantially flush with said inner surface.

References Cited by the Examiner
UNITED STATES PATENTS

| | | | |
|---|---|---|---|
| 624,144 | 5/1899 | Wilmot | 138—151 |
| 665,462 | 1/1901 | Peek | 15—242 |
| 2,236,123 | 3/1941 | Von Pierce | 15—242 |
| 2,663,560 | 12/1953 | Muller et al. | 263—32 |
| 2,797,077 | 6/1957 | Muller | 263—32 |
| 3,037,757 | 6/1962 | Deussner | 263—32 |

FREDERICK L. MATTESON, JR., *Primary Examiner.*

NORMAN YUDKOFF, WILLIAM F. O'DEA,
*Examiners.*

F. E. DRUMMOND, D. A. TAMBURRO,
*Assistant Examiners.*